(No Model.)

4 Sheets—Sheet 1.

F. H. RICHARDS.
WEIGHING MACHINE.

No. 579,450.  Patented Mar. 23, 1897.

Witnesses:
Chas. D. King.
Fred. J. Dole.

Inventor:
F H Richards (No Model.)

F. H. RICHARDS.
WEIGHING MACHINE.

No. 579,450. Patented Mar. 23, 1897.

Witnesses:
Chas. D. King.
Fred. J. Dole.

Inventor:
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 579,450, dated March 23, 1897.

Application filed November 28, 1896. Serial No. 613,816. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to automatic weighing-machines for automatically weighing and delivering predetermined charges of granular and other free-running materials.

With respect to one of its features the invention comprehends the provision of means located intermediate the weighing mechanism and the stream-controller, the action of which is governed by the weighing mechanism for transferring to the latter a variable amount of force, which in the present instance is at its maximum at the commencement of operation and which is of progressively-decreasing effect as the load approaches completion, such force being at its minimum at a stage about concurrent with the drip period, whereby the load may be finished with accuracy.

Another object of the invention is to furnish means for applying to the device or devices which govern the discharge of the bucket-load a multiplied amount of force subsequent to the drip period. The load-discharging means in the present instance include as a constituent a latch, and I apply to the tripper therefor a multiplied amount of power, this result being obtained by an extremely-limited movement of the latch-tripper.

Another object of the invention is to furnish an efficient valve mechanism comprehending a main valve and a coacting auxiliary valve, which is preferably operated by the main valve, it being located above and movable toward said main valve and operable for reducing the supply-stream conjointly therewith, the supply being subsequently cut off by the main valve, and these two valves coöperate to prevent material from choking up at the outlet of the supply-hopper, which I may provide to deliver a stream of material to the bucket.

Figure 1:
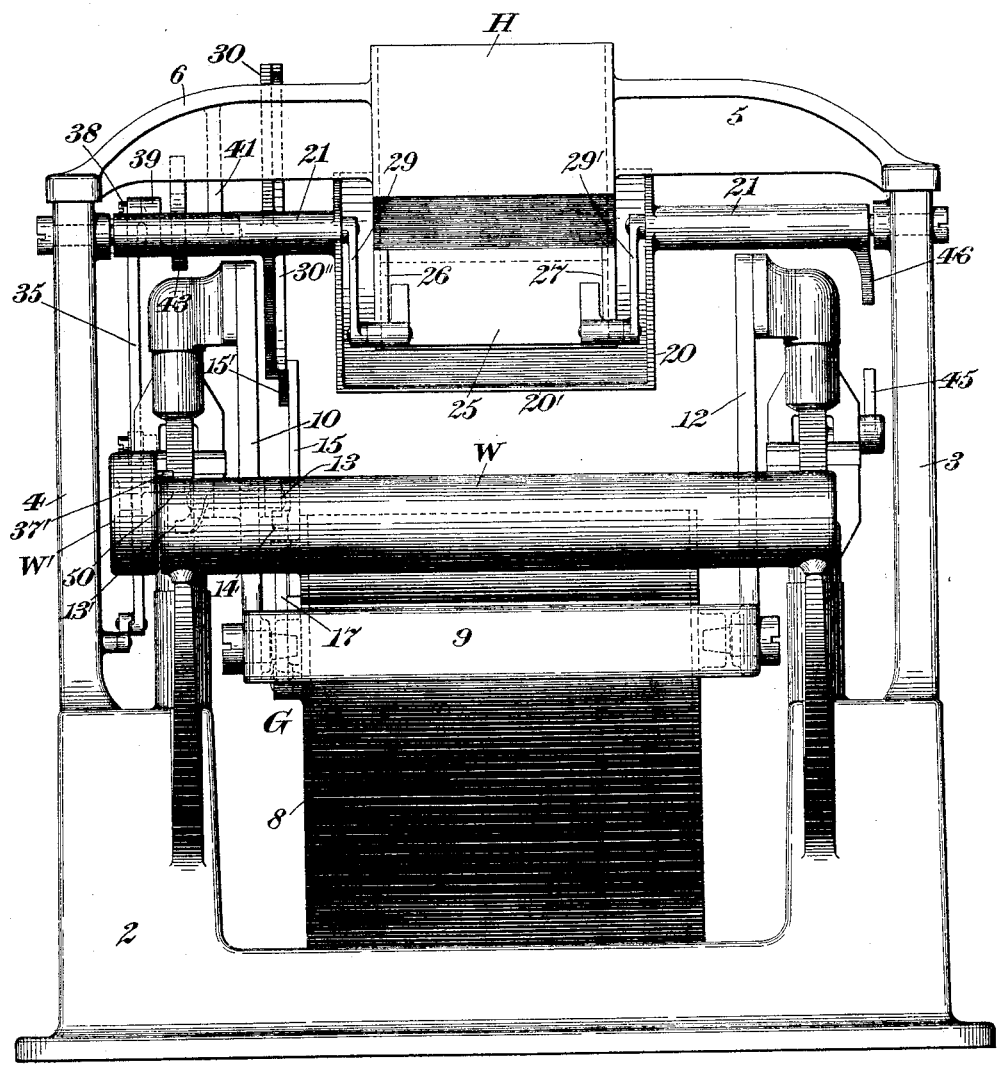
Figure 2:
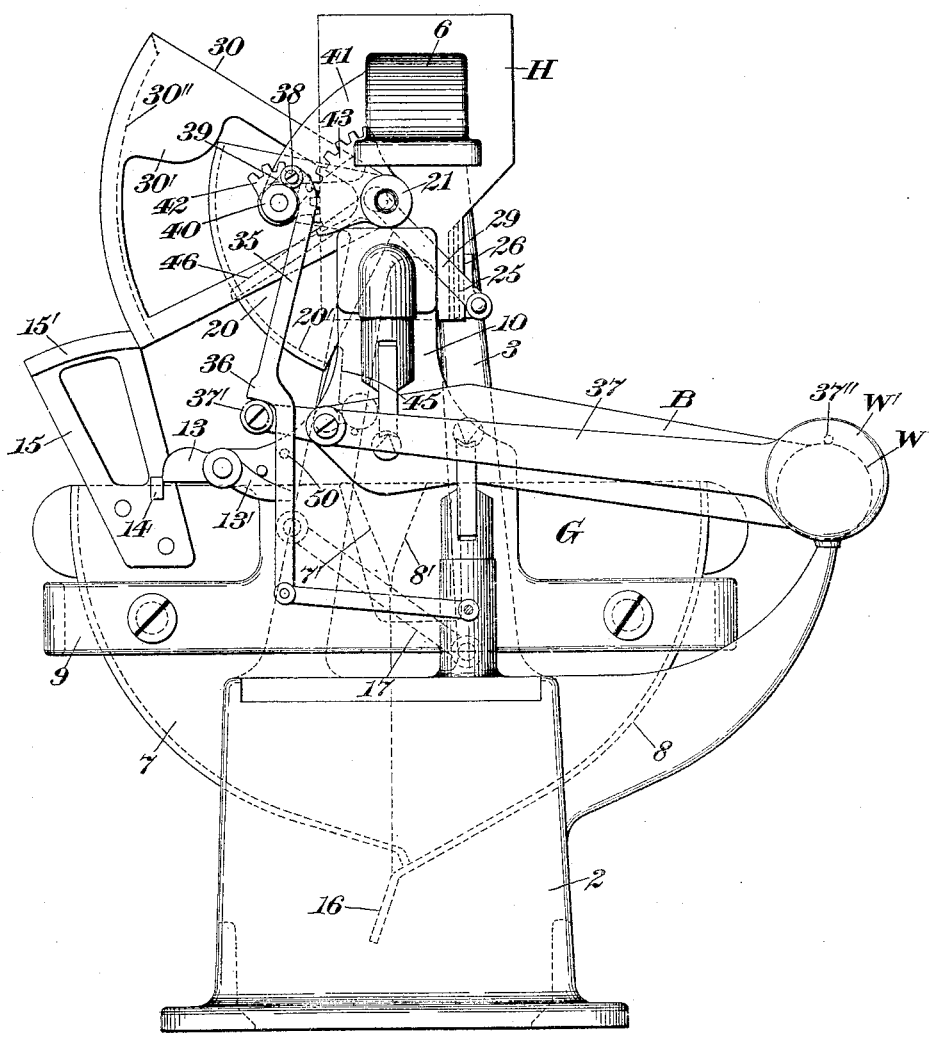
Figure 3:
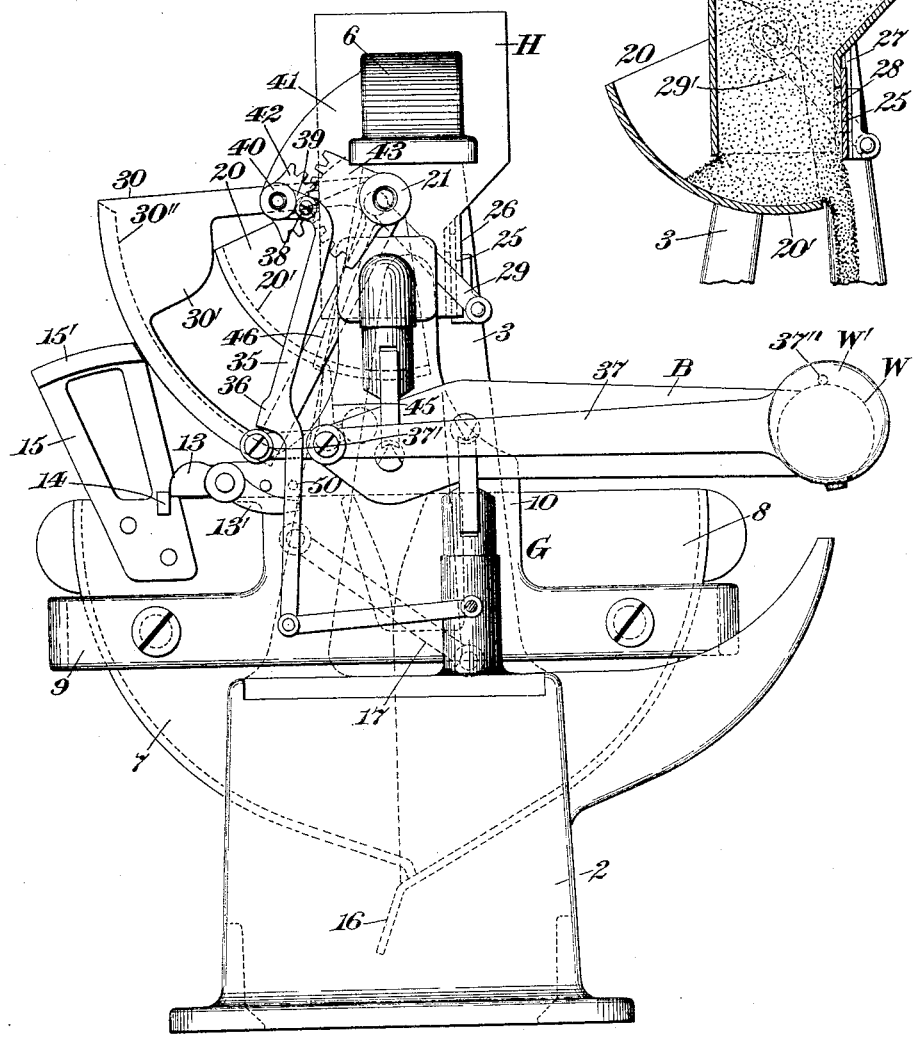
Figure 4:
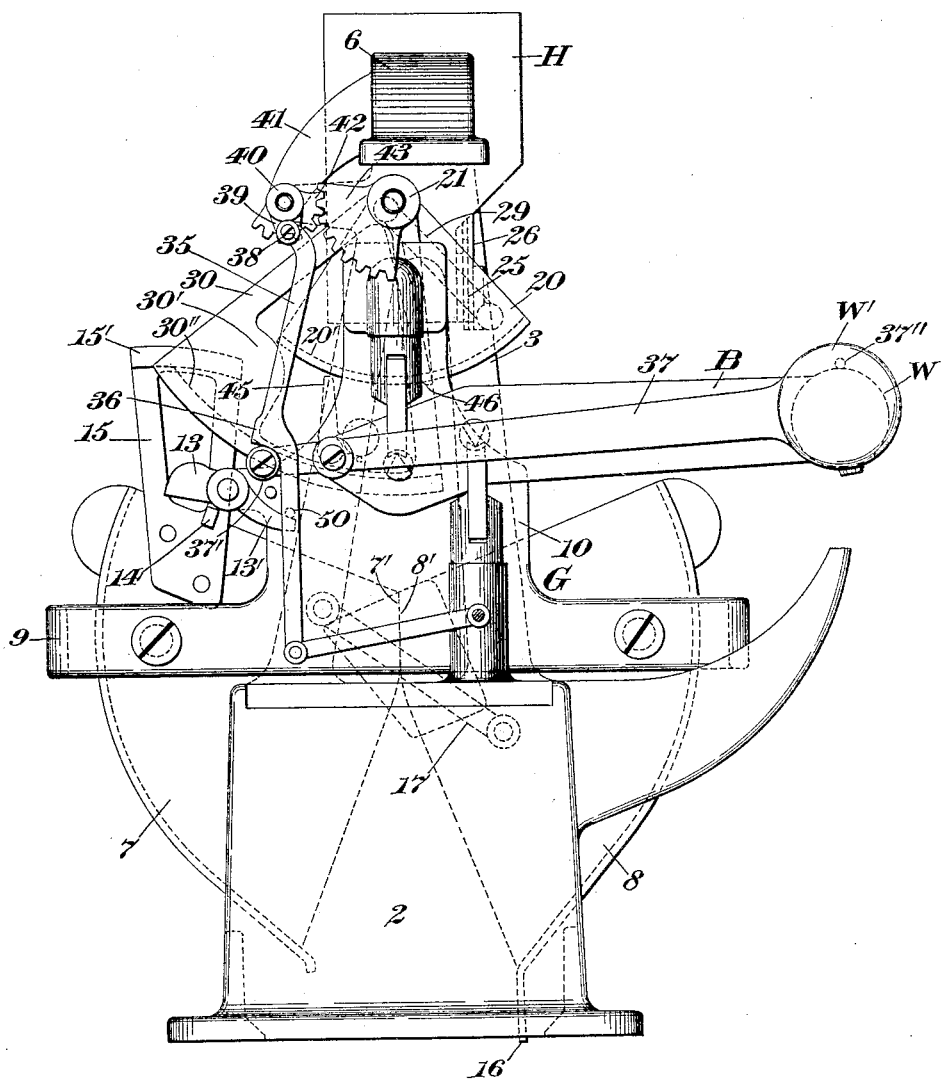

In the drawings accompanying and forming part of this specification, Figure 1 is a front elevation of a weighing-machine embodying my present improvements, and it illustrates the positions occupied by the several parts at the commencement of operation. Fig. 2 is an end elevation as seen from the left in Fig. 1, the bucket-sections being locked closed and the valve wide open. Fig. 3 is a similar view to Fig. 2, the bucket having descended somewhat with a partial load and the valve mechanism being illustrated in the drip position. Fig. 4 is a view similar to Figs. 2 and 3, the bucket-sections having been just forced open to permit the discharge of the load and the valves being closed; and Fig. 5 is a central vertical section of the supply-hopper and the valves therefor, the latter being in their drip positions.

Similar characters designate like parts in all the figures of the drawings.

The framework for sustaining the different sets of mechanisms may be of any suitable form, it being illustrated comprising a chambered base 2, the standards or columns 3 and 4 rising therefrom, and the brackets 5 and 6, which extend oppositely from the supply-hopper H, of ordinary construction, said parts being suitably joined together.

The weighing mechanism includes a load-receiver and supporting beam mechanism therefor, the load-receiver, which is designated by G, consisting in the present case of a bucket, and its counterweighted scale-beam being designated by B.

The scale-beam B consists of two longitudinal arms joined at their ends by a weight W, said arms being furnished with pivots or knife-edges resting on notched bearings carried by posts on the opposite ends of the base 2.

The bucket G comprises two substantially similar sections 7 and 8, shiftably or pivotally supported between the end members of the frame or carrier 9, said frame being furnished with risers 10 and 12, to which may be joined notched bearings sustained by pivots or knife-edges situated at the poising sides of the two arms of the beam B.

The walls of the two bucket-sections 7 and 8 are substantially straight and abut when closed, as represented in Fig. 2, said walls extending obliquely and angularly away from each other, as at 7' and 8', such oblique portions being adapted to meet, when the two sections are forced open or apart, to discharge a load, as illustrated in Fig. 4. The two sections 7 and 8 will be preferably held closed or together by a latch which governs or controls the discharge of the load.

The latch for holding the bucket-sections together or closed is designated by 13, it being pivotally supported upon an ear on the riser 10 and limited in its action by a suitably-positioned stop or pin thereon, and it swings downward to engage the stud 14 on the bucket G when the two members are in their normal positions, as represented in Fig. 2, said latch being preferably counterweighted to facilitate such action. The stud 14 extends from the segment 15, which is suitably fastened to the bucket.

On the completion of the load the latch or counterweighted arm thereof will be suitably elevated by the depression of the other arm or tailpiece 13' of said latch, which operation will result in freeing the two bucket-sections, so that the mass of material within the bucket may promptly force them apart, as indicated in Fig. 4, to effect a discharge of the load, said sections being preferably counterweighted to return them to their normal or shut positions, as shown in Fig. 2.

The bucket-section 8 will be furnished with a depending, preferably integral, lip 16, which is adapted to be acted upon by the material which is temporarily confined within the supporting base or bed 2, whereby the return movement of the bucket-section 8, and consequently its mate 7, as they are operatively connected, may be sufficiently retarded to allow the mass to completely gravitate from the bucket.

A link 17 is employed as a convenient means for operatively connecting the respective bucket-sections for movement in unison, said link being pivoted at its opposite ends to the two sections.

The means for supplying the bucket G with a stream of material to build up the load therein consist, in the present case, of the hopper H, to which I have hereinbefore referred, and a stream-controller or valve is furnished to regulate the amount or volume of material delivered to the bucket, and the action of said stream-controller or valve will be preferably controlled by the weighing mechanism, as is customary.

I employ two valves for the hopper, one of them constituting a main valve and the other an auxiliary valve, and the two coöperating to reduce the size of the supply-stream, which is subsequently cut off or stopped by the main valve. The main valve is designated by 20, and it is pivotally suspended between the two frames 3 and 4, for reciprocatory movement beneath the outlet of the hopper H, to either arrest or permit the supply into the bucket G, said valve being carried by or formed integral with the two-part supporting-shaft 21, which has bearings in its outer ends for receiving pivot-screws or other journals carried by said end frames. The auxiliary valve, which is mounted above the curved plate 20' of the main valve 20 and which is movable toward the same for assisting in reducing the volume of the supply-stream which flows from the hopper H, is designated by 25, and it consists of a flat plate having a limited amount of vertical sliding movement, it being carried in guideways 26 and 27 on the front face or wall of the hopper H and having a movement across the opening 28 in said wall on its descending stroke to reduce the supply-stream and to also break up any lumps that may be in the supply near the discharge edge of the main valve 20, which broken lumps are carried out by the main valve in closing. The auxiliary valve is also operable on its effective stroke for dislodging any sticks or other foreign substances which may be in the mass and which are carried out by the main valve in the manner just pointed out.

To obtain the necessary reciprocation of the auxiliary valve, I prefer to operatively connect it with the main valve, the links 29 and 29' being provided for this purpose, said links being pivoted to the inside opposite faces of the end walls of the main valve and also to brackets on the auxiliary valve 25 near its lower end, the point of connection of the links to the main valve being eccentric thereto, so that as said main valve closes the auxiliary valve will be carried downward for accomplishing the hereinbefore-described results, the opposite action with respect to the auxiliary valve taking place as the main valve opens.

For closing the main valve the weighted segment 30 may be employed, such segment being of skeleton shape and weighted, as at 30', it being preferably made integral with the two-part valve-shaft 21. The limit of movement of the weighted segment is represented by Figs. 2 and 4, the valve being shown in its wide-open and fully-closed positions, respectively, in said figures.

On reference to Fig. 2, wherein the weighted segment is illustrated occupying its primary position, it will be apparent that as it drops the connected valve 20 will be also shut for reducing and subsequently cutting off the supply to the bucket, the auxiliary valve 25 coacting by reason of its operative connections with the main valve 20 and aiding to effect this result.

In automatic weighing-machines it is necessary to control the action of the stream-controller, which in the present instance consists of the valve 20, from and by the weighing mechanism.

For the purpose of securing greater accuracy of the machine I provide instrumentalities intermediate the stream-controller and the valve for progressively reducing the force applied by the stream-controller to the weighing mechanism, such force being at its maximum at the commencement of operation and at its minimum at about the commencement of the poising period, at which time the load has been nearly completed.

There is represented at 35 a reciprocatory actuating-connector, which has an offset or shoulder 36 about midway its length, which bears against the auxiliary beam 27 or a projection or roll 37' thereof, said actuating-connector being in the form of a rod, which is jointed or pivoted at 38 to the crank-arm 39, the hub of which is secured to a short or stub shaft 40, carried for rocking movement by a sleeve or hub on the depending arm 41 on the bracket 6, the hub of said shaft having a relatively small toothed segment or sector-gear 42.

There is illustrated at 43 a relatively large toothed segment or sector-gear, which is coöperative with the valve, it being joined to the two-part shaft 21 and meshing with the toothed segment 42, which is carried by a relatively-fixed part of the machine, as the framing, so that as the sector 43 rotates through its effective arc it is operable for obtaining a multiplied angular movement of the crank-arm 39, through the interposed meshing sector 42, for at first reducing the force applied to the weighing mechanism through the rod 35 and for subsequently increasing the force applied to said rod 35 for accomplishing the discharge of the load-receiver or bucket G, said rod preferably carrying the tripper or actuator for the bucket-latch 13.

The auxiliary beam 37, which also constitutes a valve-opening actuator, is shiftably supported by the main beam B, it being pivoted thereto near the poising end and being also counterweighted, as at W', said counterweight W' being provided with a pin 37", normally resting on the weight W of the main beam B, and the mass or amount of the two weights, which act as one during the major period of operation, will in practice be experimentally determined for each size or proportion of weighing-machine made in accordance with my present improvements and will of course be made to correspond with the amount of load to be weighed.

The weight W', as just stated, normally forms a part of the total counterbalance-weight, the auxiliary beam, however, being shiftable about its center at a predetermined point, at which time the effective force of said weight is removed or subtracted from the counterpoised side and transferred to the poising side of the beam and in effect applied to the bucket for holding it down on the discharge of the load, whereby the contents of the bucket may be allowed to pass completely therefrom.

Fig. 2 represents the valve 20 in its wide-open position, the bucket-sections 7 and 8 being locked closed by the latch 13, which is in contact with the stud 14 on the skeleton segment 15. This being the case, a stream of material may flow from the hopper H and will enter the bucket, which causes the latter, and hence the main and auxiliary beams B and 37, to descend, and the latter falling away from the shoulder 36 on the rod 35 will permit the closure of the valve 20 by the combined action of the valve and the weighted open segment 30, it being understood that the valve has a preponderance of weight below its axis of oscillation to aid in effecting its closure.

It will be understood that as the center of the mass composed of the valve and the weighted segment approaches the vertical or perpendicular the rotative force or power of said members will be gradually diminished.

As the weighted segment 30 and valve 20 drop—the latter to reduce the volume of the supply-stream from the hopper H—the segment or gear 43 will be rocked in a direction coinciding with that of said members, and, being in mesh with the segment-gear 42, the latter will swing the crank-arm, and hence the rod 35, downward.

It will be seen on inspection of Fig. 2 that when the crank-arm 39 is at the limit of its upstroke the joint or pivot-point 38, which is eccentric to the gear 42, will be about the upper dead-center, and as the crank-arm 39 is caused to travel downward to its mid-stroke or intermediate position, as indicated in Fig. 3, it will be obvious that it gradually loses its efficiency, the force being at its minimum at about the time the crank-arm reaches its mid-stroke position, as indicated in said Fig. 3, at which time the progress of the valve is momentarily interrupted or arrested to permit the drip-stream to be delivered to the bucket.

The means for intercepting the closure or advancing movement of the valve consists of a stop on the weighing mechanism—such as the by-pass stop 45, of well-known construction—pivoted to an arm of the main beam B, said by-pass having its upright member disposed in the path of movement of the stop-arm 46, which extends radially from the two-part valve-shaft 21, so that at the commencement of the drip period the by-pass 45 will engage said arm 46, as shown in Fig. 3, to hold the valve 20 against further closing movement to permit the reduced or drip stream to pass into the bucket to complete the partial load therein, the beam mechanism during the drip-supply period moving away from the rod 35.

When the load is fully completed, the by-pass 45 will descend below the plane of oscillation of the arm or rod 46, consequently releasing the valve 20, so that it may be given its final closing movement by the dropping of the weighted segment 30 to the position indicated in Fig. 4, the force applied to the valve by such segment, however, being a comparatively slight one, and it is for the purpose of increasing this force near the close of the weighing operation that I interpose the force-modifying instrumentalities between the weighing mechanism and the stream-controller, so that the latch 13, to which I have hereinbefore alluded, may properly be tripped, although the power of the valve has been materially decreased.

The rod 35 is furnished at a suitable point thereon with a latch-tripper in the form of a projecting pin 50, which has a movement into engagement with the tailpiece 13' of the latch 13 at the close of the weighing operation and the cut-off movement of the valve 20 for depressing said tailpiece and elevating the latch to raise it above the stud 14, so that the two bucket-sections can be forced open or apart by the weight of the mass therein.

It will be apparent that when the valve 20 is released by the falling of the by-pass 45 with the beam mechanism on the completion of the load it will be promptly closed to cut off the drip-stream by the dropping of the weighted segment 30 in the manner hereinbefore specified, and as said valve thus shuts its shaft 21 will be rocked, and the power thereof will be sufficient to partially rotate the differential meshing segmental gears 43 and 42, whereby the crank-arm 39 will be carried from its intermediate position, as indicated in Fig. 3, to the limit of its downstroke, as shown in Fig. 4, and the pivotal point 38 will be moved to its lower dead-center, and during this action the crank-arm, as it approaches its lowest position, will apply to the rod 35, which carries the latch-tripper 50, a relatively powerful pressure, the arm 41 acting as a resistance member to facilitate this operation, it being understood, however, that the actuating power generated by the valve during its final or cut-off movement is a relatively-reduced one, and that the pivotal connection 38 will act in the nature of a toggle-joint to multiply the power of the valve.

At a predetermined point in the downward travel of the rod 35 the tripper 50 thereon will impinge against the tailpiece 13' of the latch 13 and will elevate the latter above the stud 14 to release the two bucket-sections.

In connection with the bucket and the supply-valve 20 I employ a pair of reciprocally-effective stops. The weighted valve-closing segment 30, to which I have hereinbefore referred, constitutes the valve-operative stop, while the other stop is the bucket-supported member 15, which carries the stud 14. Each of these stops is in the form of an open or skeleton segment, and they are provided with oppositely-extending flanges, the flange for the stop 15 being designated by 15', while that of its mate is denoted by 30''. The action of these stops will be clearly evident from an inspection of Figs. 2 and 4.

In Fig. 2 the valve is represented wide open, and the two bucket-sections 7 and 8 are locked closed by the latch 13, which is in contact with the stud 14, the inside curved face of the stop-flange 15' being in contact with the adjacent curved face of the flange 30'', so that should the latch 13 be tripped too quickly the stop 15 will be held from oscillation by the coacting stop 30 and until the valve 20 has reached its cut-off position, as represented in Fig. 4, so that the stop 30 will have been carried bodily across the plane of the inside curved face of the flange 15', whereby when the latch is tripped the two bucket-sections 7 and 8 may be forced apart, and in so doing the flange 15' will be carried over and contiguous to the coacting flange 30'', as indicated in Fig. 2, by the lateral swinging of the bucket-section 7, whereby the stop-flange 15' prevents retractive movement of the segment 30, and hence maintains the valve 20 firmly closed.

When the load is being discharged, the bucket and beam mechanism can rise, and the weight W of the main beam B will fall away from the pin 37'' on the auxiliary beam 37, as will be obvious, said beam 37 being held against return movement with the main beam by reason of the interlocking stop 15 acting through the intermediate connections.

When the stop 15 frees its companion by the shutting of the two bucket-sections 7 and 8, the auxiliary beam 37 may return to its initial position, and in so doing it will transmit an upward thrust to the rod 35, which is communicated to the valve 20 for forcing the latter open.

The operation of the hereinbefore-described machine, briefly, is as follows: Fig. 2 illustrates the positions occupied by the various working parts at the commencement of operation, the two bucket-sections 7 and 8 being locked shut and held in such position by the latch 13, which is in engagement with the stud 14 on the bucket G, and the valve 20 being wide open the stream of material may flow from the chute H into the empty bucket G. When a certain proportion of the load has been received by the bucket, it, with the main and auxiliary beams B and 37, will descend, so that the auxiliary beam 37, moving away from the rod 35, will permit the closure of the valve by the dropping of the weighted segment 30. At the commencement of the poising period, when the load has been nearly completed, the arm 46 on the two-part valve-shaft 21 will have been carried against the by-pass stop 45 on an arm of the beam B, which results in the temporary interruption of the closure of the valve, whereby a relatively-reduced stream or drip may flow into the bucket for finishing the load. When the load is completed, the bucket and beam mechanism will be caused to again descend, and the by-pass 45, dropping clear of the arm 46, will free the valve, so that it can be closed by the further falling of the weighted segment 30 to cut off the supply. During this lastmentioned action of the valve the rod 35 will be forced downward, by virtue of the operating devices between said rod and valve, with the tripper 50 thereon into contact with the tailpiece 13' of the latch 13, so that said latch will be elevated or lifted clear of the stud 14, which results in freeing the two bucket-sections 7 and 8, whereby they will be promptly forced open or apart by the weight of the mass therein, and when the load has been fully discharged the two bucket-sections will be closed and the other coöperating parts of the machine will resume their initial positions, as shown in Fig. 2.

Having described my invention, I claim—

1. The combination of weighing mechanism including a load-receiver; a stream-controller and its supporting-shaft carrying a gear; and a second gear meshing with said first-mentioned gear and having connected therewith an actuating member that bears against the weighing mechanism.

2. The combination of weighing mechanism including a load-receiver; a hopper situated to deliver a stream of material to the load-receiver; a reciprocatory valve and its supporting-shaft carrying a large gear; a second shaft carrying a small gear and provided with a crank-arm; and a rod connected with said crank-arm and bearing against the weighing mechanism.

3. The combination of a bucket consisting of two similar sections supported by a carrier; beam mechanism for sustaining said carrier; a segment on one of the bucket-sections, having a stud and constituting a stop; a latch operable to engage said stud, to hold the bucket-sections against movement; a valve and its supporting-shaft provided with a relatively large sector and having a weighted segment for closing the valve, said segment also constituting a stop and reciprocating with the first-mentioned stop; a shaft carrying a small sector meshing with the first-mentioned sector and having a crank-arm; and a rod pivoted to said crank-arm and bearing against the scale-beam, said rod being furnished with a tripper for said latch.

4. The combination, with weighing mechanism and with a stream-controller the action of which is governed thereby; of instrumentalities including a series of gears located between the stream-controller and the weighing mechanism, for varying the force applied by the former to the latter.

5. The combination, with weighing mechanism and with a stream-controller, of interposed instrumentalities including a series of meshing gears for varying the force applied by the stream-controller to the weighing mechanism.

6. The combination, with weighing mechanism and with a stream-controller the action of which is governed thereby, of interposed instrumentalities including a series of differential meshing gears for varying the force applied by the stream-controller to the weighing mechanism.

7. The combination of weighing mechanism; a supply-hopper having guideways therein; a main valve supported for reciprocatory movement beneath the outlet of the hopper; an auxiliary valve vertically slidable toward the main valve during the weighing of a load; and means for simultaneously actuating said valves.

8. The combination, with weighing mechanism and with a stream-controller, of an intermediate actuating-connector coöperative with the stream-controller and located to receive the force thereof; and means located between the actuating-connector and the stream-controller, for varying the force applied by the latter to the former.

9. The combination, with weighing mechanism including a shiftable load-discharge member normally held against movement by means comprehending a latch, of a stream-controller; an actuating-connector coöperative with the stream-controller and having a latch-tripper; and means located between the actuating-connector and the stream-controller, for varying the force applied by one of them to the other.

10. The combination, with weighing mechanism and with a stream-controller, of an intermediate actuating-connector coöperative with the stream-controller and located to receive the force thereof; and means situated between said actuating-connector and the stream-controller, for first decreasing and subsequently increasing the force applied by the stream-controller to said actuating-connector.

11. The combination, with weighing mechanism and with a stream-controller, of an intermediate actuating-connector coöperative with the stream-controller and located to receive the force thereof; means situated between said actuating-connector and the stream-controller, for first decreasing and subsequently increasing the force applied by the stream-controller to said actuating-connector; and instrumentalities for intercepting the progress of the stream-controller.

12. The combination, with weighing mechanism and with a stream-controller, of an intermediate actuating-connector coöperative with the stream-controller and located to receive the force thereof; means situated between said actuating-connector and the stream-controller, for first decreasing and subsequently increasing the force applied by the stream-controller to said actuating-connector; and instrumentalities for intercepting the progress of the stream-controller when the force transmitted thereby to the actuating-connector is at its minimum.

13. The combination, with weighing mechanism including a shiftable load-discharge member held against movement by means comprehending a latch, of a stream-controller; an actuating-connector coöperative with the stream-controller and having a latch-tripper; and means located between the actuating-connector and the stream-controller, for varying the force applied by the stream-controller to said actuating-connector and for increasing such force at a predetermined point in the working stroke of said actuating-connector.

14. The combination, with weighing mechanism including a load-receiver and with means comprehending a latch for controlling the discharge of said load-receiver, of a series of gears; and a tripper for said latch, connected with one of the gears.

15. The combination, with weighing mechanism including a load-receiver, of a stream-controller; a series of meshing differential gears intermediate the stream-controller and the weighing mechanism; and a reciprocatory rod connected with one of said gears and provided with means for effecting the discharge of the load-receiver.

16. The combination, with weighing mechanism including a load-receiver, of a stream-controller; a series of meshing differential gears, the shaft of one of which is carried by the framework and is provided with a crank-arm; and a reciprocatory rod provided with a device for effecting the discharge of the load-receiver, said rod being jointed to said crank-arm.

17. The combination, with a bucket consisting of two substantially similar shiftably-supported sections, of a latch for holding said bucket-sections together or closed; a hopper; a stream-controller for said hopper; a reciprocatory actuating-connector provided with a latch-tripper and in operative relation with the stream-controller; and instrumentalities located between the actuating-connector and the stream-controller, for applying to the former a relatively-multiplied amount of force.

18. The combination, with a bucket including a shiftable load-discharge member normally held against movement by means including a latch, of supporting beam mechanism for the bucket; a stream-controller; an actuating-connector provided with a latch-tripper and in operative connection with the stream-controller and also adapted to bear against a scale-beam; and instrumentalities disposed between said actuating-connector and the stream-controller, for applying to the former a multiplied amount of force at a predetermined point.

19. The combination, with a bucket including a shiftable load-discharge member normally held against movement by means comprehending a latch, of a stream-controller; reciprocally-effective stops operative, respectively, with said stream-controller and with the shiftable load-discharge member; an actuating-connector in operative connection with a scale-beam and with the stream-controller and also having a tripper for the latch; and instrumentalities situated between said actuating-connector and the stream-controller, for applying a multiplied amount of force at a predetermined point.

20. The combination, with a bucket embodying a shiftable load-discharge member normally held against movement by means comprehending a latch, of beam mechanism comprehending a main beam and an auxiliary beam supported thereby for shifting movement; a stream-controller; reciprocally-effective stops operative, respectively, with the stream-controller and with the shiftable load-discharge member; an actuating-connector located to bear against the auxiliary scale-beam and in operative connection with the stream-controller and also having a latch-tripper; and instrumentalities situated between the stream-controller and the actuating-connector, for applying to the latter a multiplied amount of force at a predetermined point.

21. The combination, with weighing mechanism and with a stream-controller; of a series of intermediate gears, one of which is connected to a resistance member; and an actuating-connector coöperative with the weighing mechanism and with the stream-controller and having its joint eccentric to the gear that is carried by said resistance member.

22. The combination, with framework and with weighing mechanism, of a stream-controller; a series of gears intermediate the weighing mechanism and the stream-controller, one of which is mounted upon the framework; and an actuating-connector coöperative, respectively, with the stream-controller and with the weighing mechanism and having its joint eccentric to the gear which is carried by the framework.

23. The combination, with weighing mechanism and with a stream-controller having a shaft, of a gear carried by said shaft; a meshing gear the shaft of which is furnished with a crank-arm; and a rod jointed to said crank-arm and in operative connection with the weighing mechanism.

24. The combination, with a hopper; of main and auxiliary valves therefor, the main valve being reciprocatory beneath the outlet of the hopper, and the auxiliary valve being located above, and supported for movement toward and from, the main valve; and means for simultaneously actuating said valves.

25. The combination, with a hopper; of operatively-connected main and auxiliary valves, the main valve being reciprocatory beneath the outlet of the hopper and the auxiliary valve being located above and movable toward and from the main valve; and valve-actuating mechanism.

26. The combination, with a hopper having guideways; of main and auxiliary valves for said hopper, the main valve being reciprocatory below the outlet of the hopper, and the auxiliary valve being located above, and supported for movement toward and from, the main valve in said guideways; and means for simultaneously actuating said valves.

27. The combination, with a hopper having guideways; of main and auxiliary valves for said hopper, the main valve being reciprocatory beneath the outlet of the hopper and the auxiliary valve being movable toward and from the main valve in said guideways; a link or links operatively connecting the two valves; and valve-actuating mechanism.

FRANCIS H. RICHARDS.

Witnesses:
FRED. J. DOLE,
F. N. CHASE.